(12) United States Patent
Berger et al.

(10) Patent No.: US 7,853,907 B2
(45) Date of Patent: Dec. 14, 2010

(54) OVER APPROXIMATION OF INTEGRATED CIRCUIT BASED CLOCK GATING LOGIC

(75) Inventors: Israel Berger, Haifa (IL); Cynthia Rae Eisner, Zichron Yaacov (IL); Alexander Itskovich, Yoqneam Ilit (IL); Dan Ramon, Yokne'am Ilit (IL)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 11/836,160

(22) Filed: Aug. 9, 2007

(65) Prior Publication Data

US 2009/0044154 A1   Feb. 12, 2009

(51) Int. Cl.
*G06F 17/50* (2006.01)
(52) U.S. Cl. ............................................. 716/5; 716/1
(58) Field of Classification Search ...................... 716/1, 716/5
See application file for complete search history.

(56) References Cited

U.S. PATENT DOCUMENTS

| | | | |
|---|---|---|---|
| 7,370,292 B2* | 5/2008 | Baumgartner et al. | 716/2 |
| 7,458,050 B1* | 11/2008 | Arbel et al. | 716/7 |
| 7,562,325 B1* | 7/2009 | Arbel et al. | 716/7 |
| 2004/0019468 A1* | 1/2004 | De Moura et al. | 703/2 |
| 2004/0153977 A1 | 8/2004 | Wilcox et al. | |
| 2004/0230923 A1* | 11/2004 | Wilcox et al. | 716/2 |
| 2005/0005255 A1* | 1/2005 | Grinchuk et al. | 716/18 |
| 2006/0129952 A1* | 6/2006 | Baumgartner et al. | 716/2 |
| 2007/0130549 A1 | 6/2007 | Eisner et al. | |
| 2008/0127002 A1* | 5/2008 | Baumgartner et al. | 716/2 |
| 2010/0042569 A1* | 2/2010 | Arbel et al. | 706/45 |

OTHER PUBLICATIONS

A. Kemper et al., "Optimizing Boolean Expression in Object Bases", (Source: http://www.vldb.org/conf/1992/P079.PDF) Proceedings of the 18th Conference on Very Large Databases, Morgan Kaufman pubs. (Los Altos CA), Vancouver (1992).
A.C. Williams et al., "Simultaneous optimization of dynamic power, area and delay in behavioural synthesis", IEE Proceedings: Computers and Digital Techniques, v 147, n 6, Nov. 2000, p. 383-390.

* cited by examiner

*Primary Examiner*—Jack Chiang
*Assistant Examiner*—Suchin Parihar (57) ABSTRACT

A novel method for optimizing the implementation of clock gating logic in digital circuits utilizing clock gating. The method over-approximates the clock gating function by removing the variable with the least influence on the resulting approximation function. Approximations of clock gating functions expressed in normal form are performed by removing an appropriate component from the function. Approximations of clock gating functions expressed in conjunctive normal form are performed by removing a clause from the function. Approximations of clock gating functions expressed in disjunctive normal form are performed by removing a literal from a clause in the function.

20 Claims, 8 Drawing Sheets

|  | 12 VARIABLES | | 14 ORIGINAL FUNCTION F(A,B,C)=(A&B)\|C | 16 APPROXIMATION FUNCTION A_F(A,B,C)=B\|C |
|---|---|---|---|---|
| A | B | C | | |
| 0 | 0 | 0 | 0 | 0 |
| 0 | 0 | 1 | 1 | 1 |
| 0 | 1 | 0 | 0 | 1 |
| 0 | 1 | 1 | 1 | 1 |
| 1 | 0 | 0 | 0 | 0 |
| 1 | 0 | 1 | 1 | 1 |
| 1 | 1 | 0 | 1 | 1 |
| 1 | 1 | 1 | 1 | 1 |

OVER APPROXIMATION OF INTEGRATED CIRCUIT BASED CLOCK GATING LOGIC

REFERENCE TO RELATED APPLICATION

The present invention is related to U.S. application Ser. No. 11/755,015, filed May 30, 2007, entitled "Apparatus For And Method Of Estimating The Quality Of Clock Gating Solutions For Integrated Circuit Design," incorporated herein by reference in its entirety

FIELD OF THE INVENTION

The present invention relates to the field of integrated circuit design tools and more particularly relates to a method of optimizing logic design by simplifying clock gating logic circuitry through an over-approximation of the clock gating function.

BACKGROUND OF THE INVENTION

Due to the increased density of modern integrated circuits (ICs), the amount of power consumed by modern ICs continues to escalate. In response, there has been an increasing focus to lower the power consumption of new digital hardware circuits. One approach to reducing power consumption is to employ so called clock gating, a technique which manufacturers have incorporated into the automated design of digital hardware circuits.

Clock gating is a well known technique used to reduce the power consumption of digital hardware circuits. It is often employed as one of several power saving techniques typically applied to synchronous circuits used in large microprocessors and other complex circuits. To save power, clock gating solutions add additional logic to a circuit to modify the functionality of the clock input of a flip-flop or latch, thereby disabling portions of the circuitry where flip-flops or latches do not change state.

Issues that arise with clock gating include both the cost of implementing the clock gating logic, the amount of power consumed by the clock gating logic portion of the circuit and the fact that applying clock gating techniques affects the timing of the clock signal. As a rule, the size of clock gating logic is proportional to the timing problems that accompany a clock gating implementation. One way to address this problem is to slow down the clock in order to allow gating function computations to finish without violating setup and hold times of the memory elements. This, however, is not usually a viable solution, and in fact, current synthesis tools reject logically valid clock gating solutions due to timing problems.

An alternative solution is to reduce the size of the clock gating logic portion of the circuit by approximation of the gating function. The main factor affecting the size of the logic is the number of inputs. By reducing the number of inputs, the size of the logic of the gate function is reduced, the preventing its rejection because of timing problems.

Therefore, there is a need for hardware development tool mechanism that can reduce the size of the logic necessary to implement clock gating in a digital design by over-approximating the clock gating function. Preferably, the development tool allows the use of clock gating techniques when the clock gating is applied to the critical path, by fixing the problem of time deficit simultaneously with calculating the clock gating function. In addition, any implementation of a proposed over-approximation of the original clock gating function must not slow the clock will decrease performance of the digital design.

SUMMARY OF THE INVENTION

The present invention is a method of reducing the size of digital logic circuitry necessary to implement clock gating. This is performed by generating an approximation of the clock gating function which both reduces the size of the clock gating logic circuitry and solves the timing problems of the clock gating logic. A clock gating function is defined as the function that is logically ANDed with the clock input of the memory element (possibly through a clock buffer). Thus, the direction of the approximation needed is an over-approximation. The over-approximation is generated by either (1) removing a single variable from the original clock gating function or (2) removing a single component from the normal form representation of the clock gating function. In both cases, the element removed as a result of the over-approximation has the least influence on the resulting function.

In clock gating, a good over-approximation can be defined as one which results in a simpler function which uses fewer variables, but differs as little as possible from the original function. Note that over-approximation of the clock gating function results in the clock ticking more than necessary, and that accordingly certain modifications to the data input(s) of the memory element might need to be made, if the data input functions were optimized under the assumption of clock gating.

The invention is operative to facilitate the development of synthesis tools which generate more efficient over-approximations of clock gating logic functions for digital designs. Efficient over-approximations result in clock gating circuitry that leaks less power, is less expensive to implement, and does not slow down the clock to allow gating function computations to finish without violating setup and hold times.

The invention analyzes all the inputs and the resulting output of a clock gating logic function. An optimal over-approximation is achieved by calculating the influence of each variable in the function, and eliminating the variable with the least influence. For an over-approximation, the variable is eliminated by ORing together the value when the variable is set to 0 with the value when the variable is set to 1.

The mechanism of the invention is capable of operating at a relatively early stage in the design cycle. The mechanism operates on clock gating solutions that are generated at a stage in the design wherein the exact logic design is not finalized. The functionality is known but the circuit has not yet been optimized, thus exact timing information or power usage is not available. Alternatively, the mechanism of the invention could be used at a late stage of the design cycle.

The advantage of the over-approximation technique of the invention is the ability to save power by implementing clock gating logic in digital designs where the original clock gating function made clock gating impractical, without the need to slow down the clock Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of over approximating a clock gating function having a plurality of variables, the method comprising the steps of selecting one of said plurality of variables to be eliminated from said function, removing said selected variable from said function, calculating an approximation function to reflect the absence of said selected variable, replacing the original clock gating function with said approximation function and adjusting the data input of the memory element to accommodate the over-approximation.

There is also provided in accordance with the invention, a method of over-approximating a clock gating function represented in conjunctive normal form (CNF) having a plurality of clauses, the method comprising the steps of selecting one of said plurality of clauses to be eliminated from said CNF representation, removing said selected clause from said CNF representation, calculating an approximation function reflecting the absence of said selected clause, replacing said original clock gating function with said approximation function and adjusting the data input of the memory element to accommodate the over-approximation.

There is further provided in accordance with the invention, a method for o over-approximating a clock gating function represented in disjunctive normal form (DNF) having a plurality of literals, the method comprising the steps of selecting one of said plurality of literals to be eliminated from said DNF representation, removing said selected literal from said DNF representation, calculating an approximation function reflecting the absence of said selected literal, replacing said original clock gating function with said approximation function and adjusting the data input of the memory element to accommodate the over-approximation.

There is also provided in accordance with the invention, a method for over-approximating a clock gating function expressed in normal form containing a plurality of components, the method comprising the steps of selecting one of said plurality of components to be eliminated from said normal form representation, removing said selected component from said normal form representation, calculating an approximation function reflecting the absence of said selected component, replacing said original clock gating function with said approximation function and adjusting the data input of the memory element to accommodate the over-approximation.

BRIEF DESCRIPTION OF THE DRAWINGS

The invention is herein described, by way of example only, with reference to the accompanying drawings, wherein.

z 2 is a flow diagram illustrating the method of adjusting a memory element data input in order to accommodate the over-approximation of the current invention.

DETAILED DESCRIPTION OF THE INVENTION

The present invention is a method of reducing the size of the logic necessary to implement clock gating. This is performed by generating an over-approximation of the clock gating function which both reduces the size of the clock gating logic circuitry and solves the timing problems of the clock gating logic. The over-approximation is generated by either removing a single variable from the original clock gating function or by removing a single component from the normal form representation of the clock gating function. In both cases, the element removed has the least influence on the resulting function.

Figure 1:
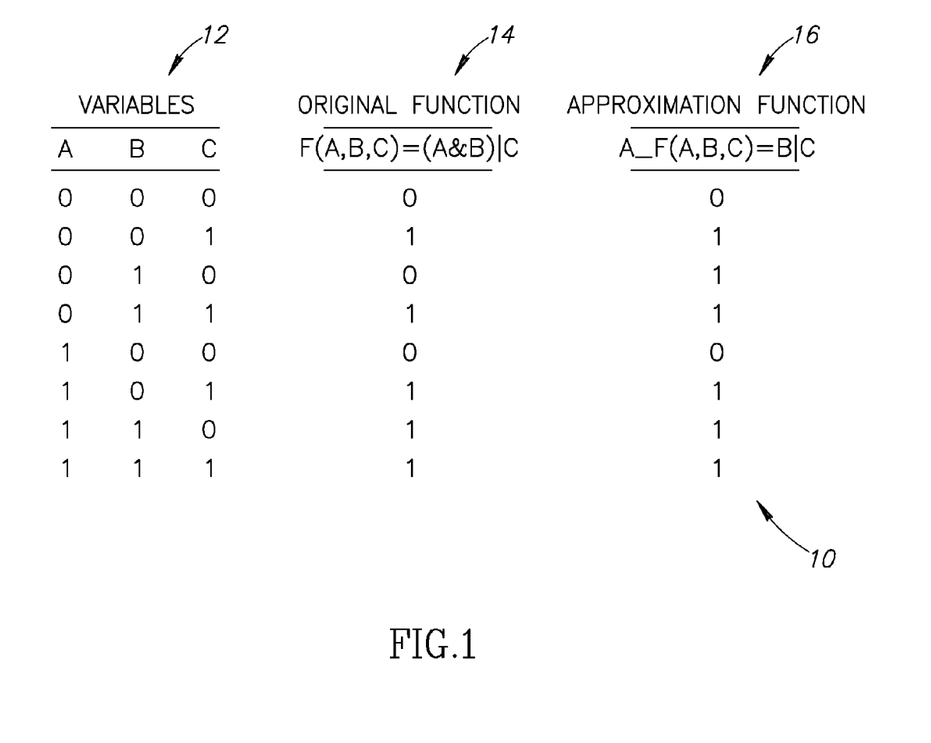
FIG. 1 is a truth table illustrating the results of an over-approximation procedure.

A truth table illustrating an example of an over-approximation is shown in FIG. 1. The truth table, generally referenced 10, comprises variables 12, original function 14 and an over-approximation of the function 16. The original function $F(\ )$ is $$F(A,B,C)=(A \& B)|C$$

In this case, the over-approximation is accomplished by removing variable A, resulting in the approximation function $$A\_F(B,C)=B|C$$

Function $A\_F(\ )$ is a good over-approximation of $F(\ )$ since, as the truth table indicates, for every value of A, B, C, $$A\_F(B,C)>=F(A,B,C)$$

In other words, the over-approximation function $A\_F(\ )$ enables the clock in at least all the cases where $F(\ )$ enables the clock.

Normal forms include conjunctive normal form (CNF) and disjunctive normal form (DNF). A CNF representation of a function is a representation of the function as a conjunction of clauses, where each clause is a disjunction of literals. Every function has a representation in conjunctive normal form. For example, the function $(A \& B)|C$ is represented in CNF as $(A|C) \& (B|C)$. In addition, there exist techniques well known in the art to convert a function to CNF. A DNF representation of a function is a representation of the function as a disjunction of cubes, where each cube is a conjunction of literals. Every function has a representation in disjunctive normal form. For example the function (A & B)|C is already represented in DNF. In addition, there exist techniques well known in the art to convert a function to DNF.

Figure 2:
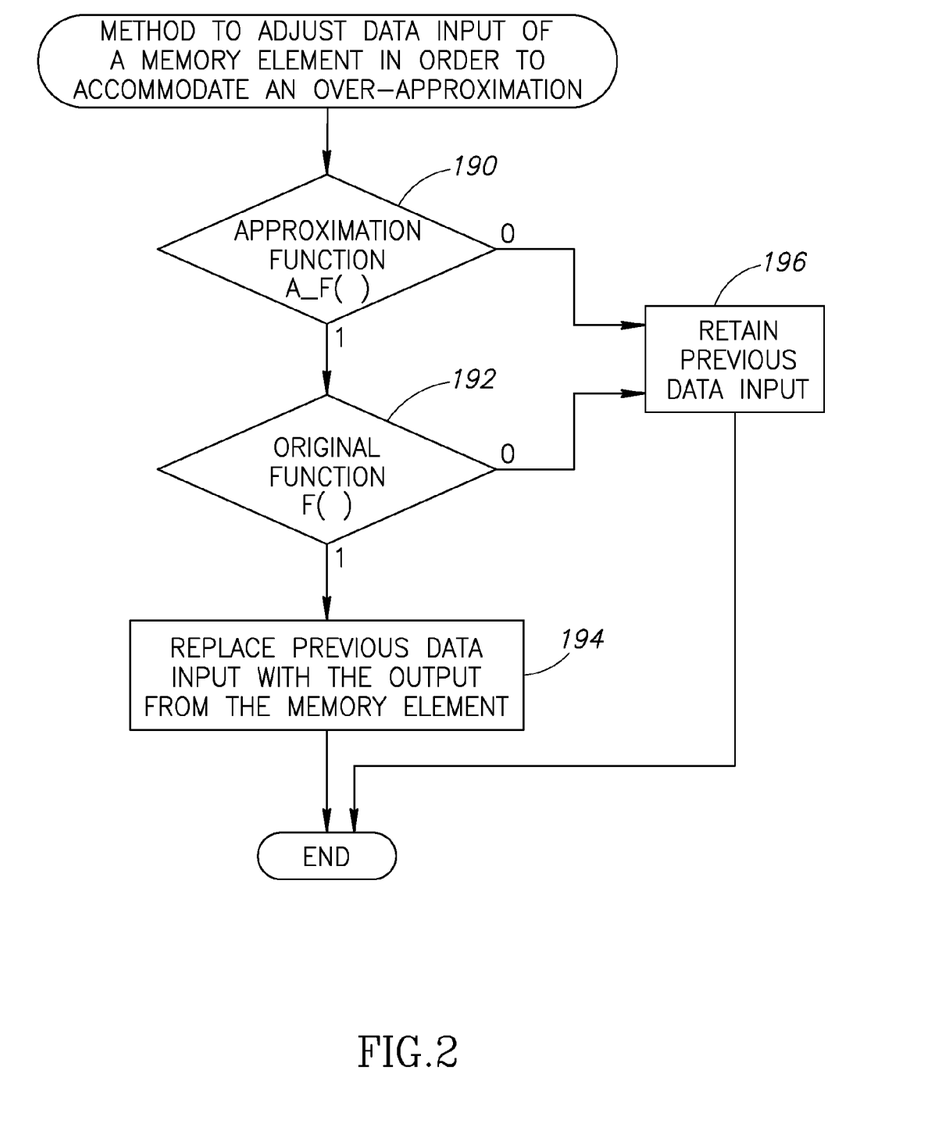

A good over-approximation of a clock gating function can be defined as one which results in a simpler function which uses fewer variables, but differs as little as possible from the original function. Note that over-approximation of the clock gating function will result in the clock ticking more than necessary. In this case, this requires adjusting the data input of the memory element (i.e., flip-flop, latch etc.). A flow diagram illustrating the method to adjust the data input of the memory element is shown in FIG. 2. First, the result of the approximation function A_F( ) (step 190) is compared with the result of the original function F( ). In the case where A_F( ) equals one when F( ) equals zero, then replace the previous data input with the output from the memory element (step 194). Otherwise, retain the previous data input (step 196). Alternatively, this can be expressed as follows: Let D be the previous data input and let Q be the output of the memory element in question. Then the new data input is if A_F & !F then Q else D where A_F( ) is the approximation function for F( ). This data function may later be simplified or reduced using techniques well known in the art.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Over-Approximation of A Clock Gating Function

In accordance with the invention, over-approximation of a clock gating function is performed by removing the variable with the least influence on the resulting function. Implementing the over-approximated clock gating function results in clock gating circuitry that meets timing constraints while at the same time saving power through clock gating, all without requiring the clock to be slowed down in order to meet setup and hold times.

Figure 4:
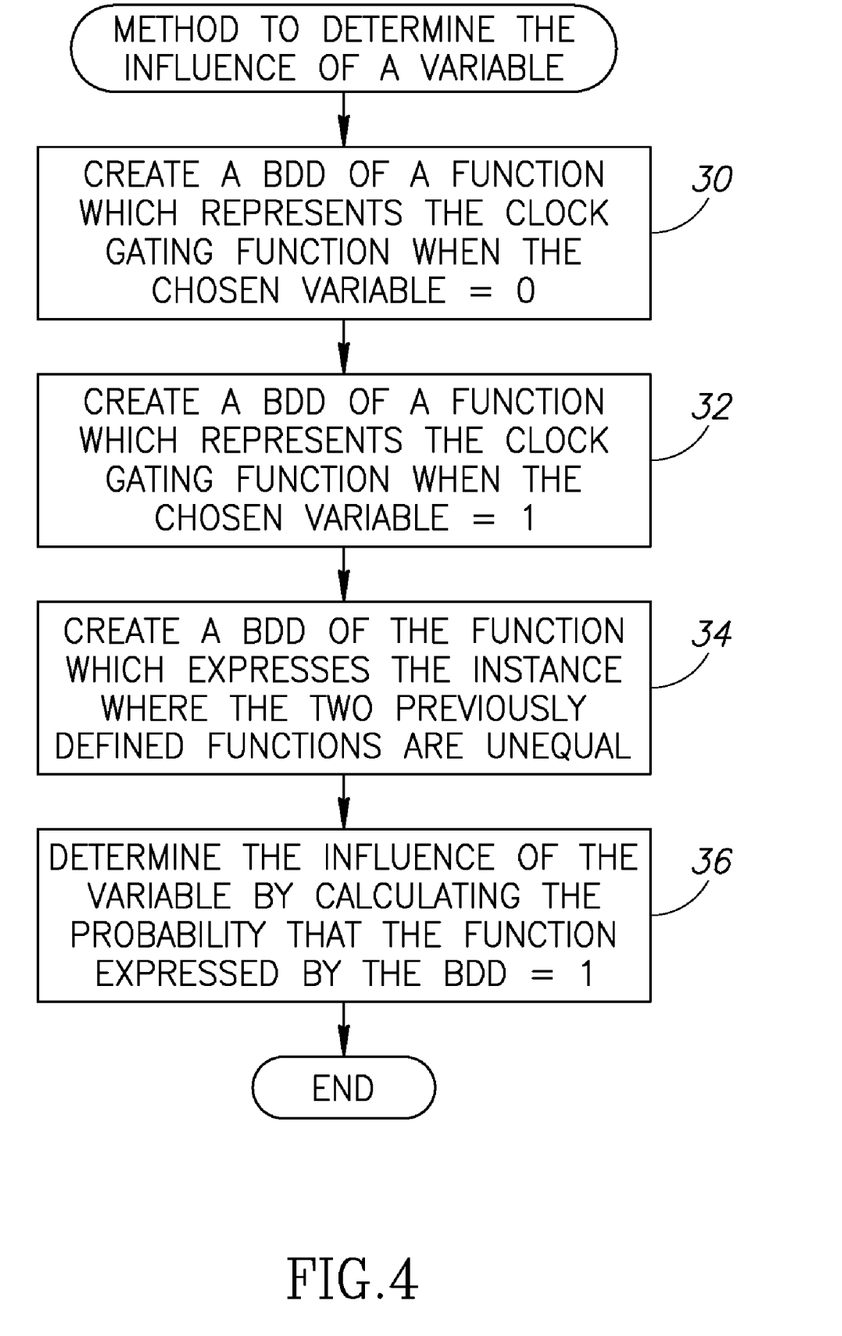
FIG. 4 is a flow diagram illustrating the method of determining the influence of a variable of the present invention.

Determining the influence of each variable is accomplished by generating functions (possibly but not necessarily represented by binary decision diagrams) for the influence of each variable on the clock gating logic function. A flow diagram illustrating the method to determine the influence of a chosen variable is shown in FIG. 4. The first step involves creating a function (e.g. a BDD) that represents the clock gating function when the chosen variable equals 0 (step 30). A second function (e.g. BDD) is then created that represents the clock gating function when the chosen variable equals 1 (step 32). Next, a third function (e.g. BDD) is created which expresses the instance where the two functions created in steps 30 and 32 are not equal (step 34). Finally, the influence of the chosen variable is determined by calculating the probability that the function created in step 34 equals 1 (step 36).

After determining the influence of each variable on the resulting function, the variable with the least influence is chosen, and an over-approximation function is generated which does not use the chosen variable. The resulting over-approximation function is then substituted for the original clock gating function and implemented in the digital design. As noted previously, this may involve correcting the data input function of the memory element being clock gated.

Eliminating a Clocking Function Variable

In operation, the invention analyzes of all the inputs and resulting output of a clock gated circuit. The method eliminates a single variable from the original clock gating function. The method assumes that every variable has equal probability of having the value 0 and the value 1, that every signal input (i.e. variable) into the clock gating function has the same arrival time and that there are no other considerations to be taken into account. Later we remove these restrictions and consider the more general case.

For example, the function F(A,B,C)=(A & B)|C is over-approximated by eliminating variable A, resulting in the over-approximation function $A_F(B, C)=B|C$. Once one variable has been chosen for elimination, it can be eliminated as follows.

Let $F(X_0, X_1, \ldots X_n)$ be the original clock gating function, and let $X_i$ be the variable chosen for elimination. The resulting approximation is $$A_{Xi}=F(\ )|_{Xi=0}|F(\ )|_{Xi=1}$$

where $F(\ )|_{X=C}$ is the function resulting from setting variable X to constant value C.

Figure 3:
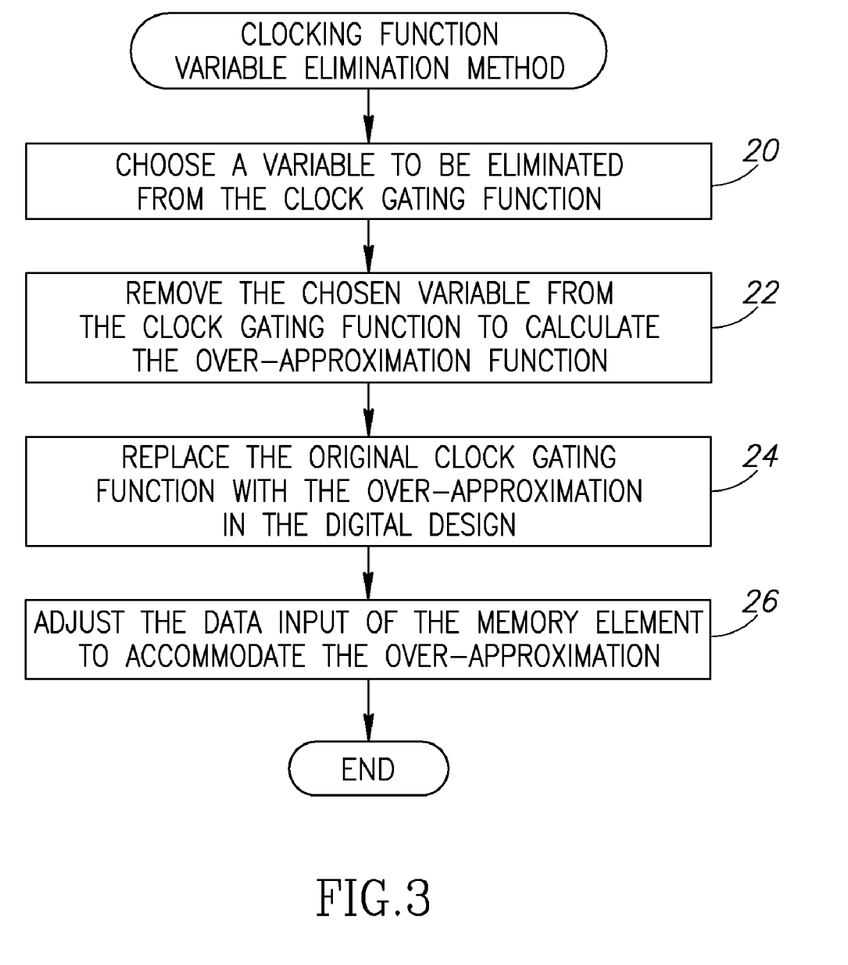
FIG. 3 is a flow diagram illustrating the clock gating function variable elimination method of the present invention.

A flow diagram illustrating the clocking function variable elimination method can be found in FIG. 3. In an example embodiment of the invention, a circuit designer loads a digital design containing a clock gated circuit to a logic design system. Using the steps previously described in FIG. 4, a variable is chosen to be eliminated from the clock gating function (step 20). The chosen variable is eliminated from the original clock gating function to calculate the approximation function (step 22). The original clock gating function is then replaced with the over-approximation function in the digital design (step 24). Finally, using the steps previously described in connection with FIG. 2, the data input of the memory element is adjusted to accommodate the over-approximation (step 26).

The optimal over-approximation is accomplished when the variable chosen to be eliminated has the least influence on the resulting over-approximated function. Determining which variable has the least influence is performed as follows:

1. For a function $F(X_0, X_1, \ldots X_n)$ (which we will call F), build functions $F_{X0}$, $F_{X1}$, through $F_{Xn}$ as follows:

$$F_{Xi}(X_0, X_1, \ldots X_{i-1}, X_{i+1}, \ldots X_n) = F|_{Xi=0}! = F|_{Xi=1}$$

2. Let the influence $L_{Xi}$ of variable $X_i$ be the number of lines in the truth table of $F_{Xi}$ that have the value 1.
3. Choose the variable with the least influence.

Assume without loss of generality that it is $X_j$. Therefore a good approximation $A_F$ of function F is: $A_F = F|_{Xj=0} | F|_{Xj=1}$. If necessary, further approximations of the function $A_F$ can be performed if a smaller function than $A_F$ is required.

Building truth tables to determine the variable with the least influence is usually impractical. The same functionality can be achieved by using any symbolic means to manipulate the functions, for example binary decision diagrams (BDD).

Figure 5:
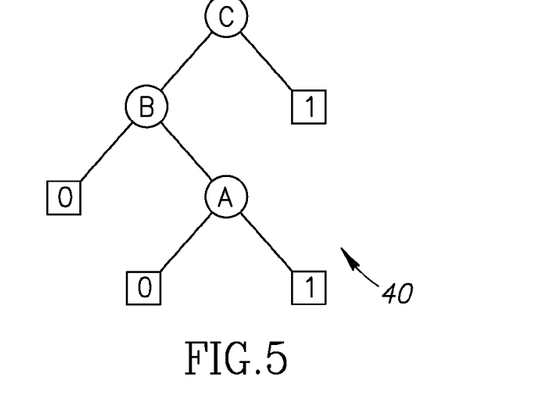
FIG. 5 is a binary decision diagram (BDD) illustrating a function $F(A,B,C)=(A \& B)|C$, to be over-approximated.
Figure 7A:
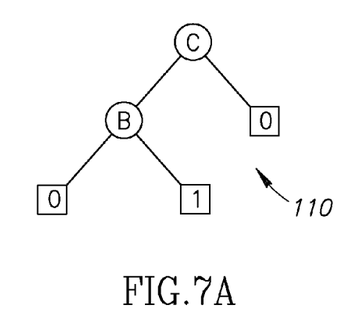
FIG. 7A is a BDD illustrating the comparison of function $F(A,B,C)=(A \& B)|C$ when A equals 0, with the function when A equals 1.
Figure 7B:
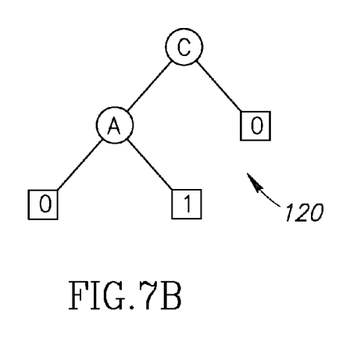
FIG. 7B is a BDD illustrating the comparison of function $F(A,B,C)=(A \& B)|C$ when B equals 0, with the function when B equals 1.
Figure 7C:
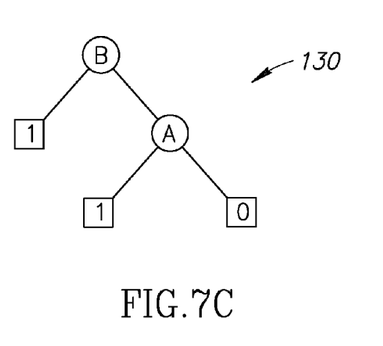
FIG. 7C is a BDD illustrating the comparison of function $F(A,B,C)=(A \& B)|C$ when C equals 0, with the function when C equals 1.
Figure 8A:
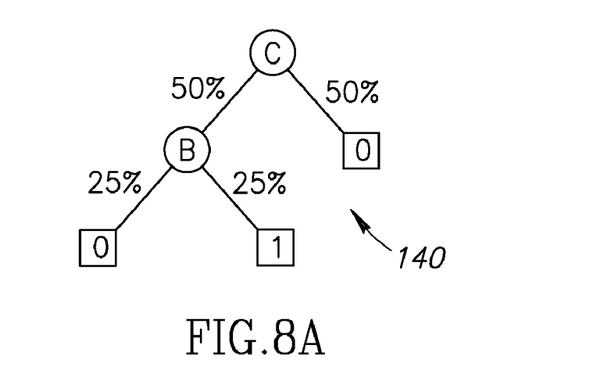
FIG. 8A is a BDD illustrating the influence of variable A on function $F(A,B,C)=(A \& B)|C$.
Figure 8B:
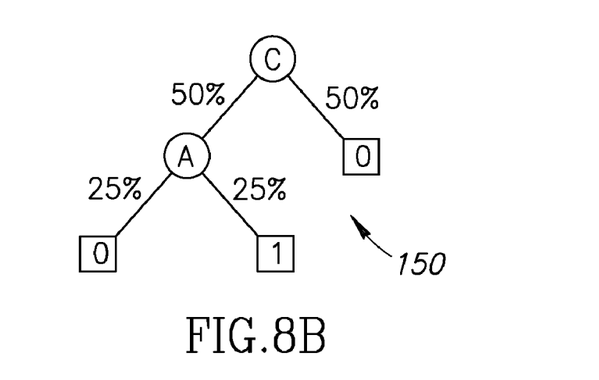
FIG. 8B is a BDD illustrating the influence of variable B on function $F(A,B,C)=(A \& B)|C$.
Figure 8C:
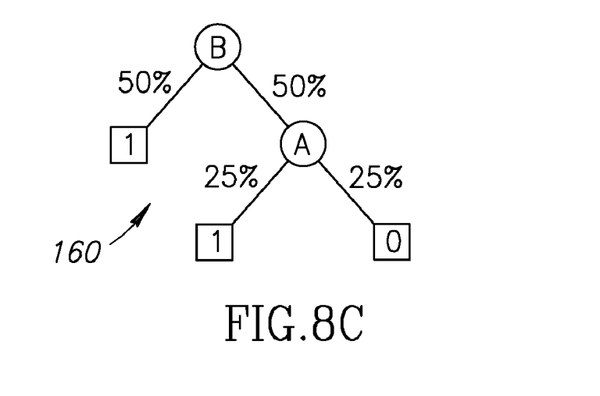
FIG. 8C is a BDD illustrating the influence of variable C on function $F(A,B,C)=(A \& B)|C$.

An illustrative example of using BDDs to determine the variable with the least influence is shown in FIGS. 5, 6A, 6B, 6C, 6D, 6E, 6F, 7A, 7B, 7C and 8A, 8B, 8C. FIG. 5 illustrates the original function. FIGS. 6A, 6B, 6C, 6D, 6E, 6F illustrate the BDDs of the function when each variable equals 0 and when each variable equals 1. FIGS. 7A, 7B and 7C illustrate the BDDs indicating the influence of each variable. Finally, FIGS. 8A, 8B and 8C show the influence of each variable.

An example function to which the over-approximation mechanism of the present invention is applied to is shown in FIG. 5. The BDD, generally referenced 40, is a representation of the function $F(A,B,C) = A \& B|C$.

Figure 6A:
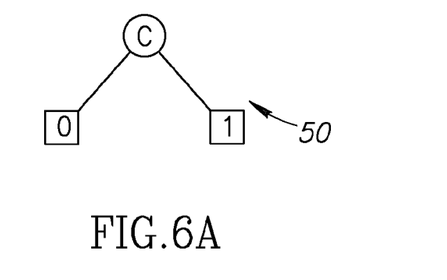
FIG. 6A is a BDD illustrating the function $F(A,B,C)=(A \& B)|C$, restricted to the case where A equals 0.

FIG. 6A shows the BDD, generally referenced 50, of $F|_{A=0}$, which is the resulting function of $F(A,B,C)=(A \& B)|C$ when A equals 0. The resulting function is $F(C)=C$.

Figure 6B:
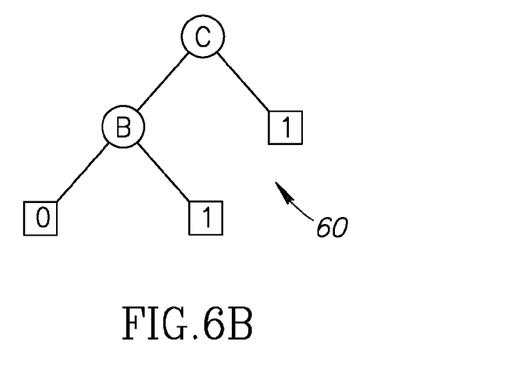
FIG. 6B is a BDD illustrating the function $F(A,B,C)=(A \& B)|C$, restricted to the case where A equals 1.

FIG. 6B shows the BDD, generally referenced 60, of $F|_{A=1}$, which is the resulting function of $F(A,B,C)=(A \& B)|C$ when A equals 1. The resulting function is $F(B,C)=B|C$.

Figure 6C:
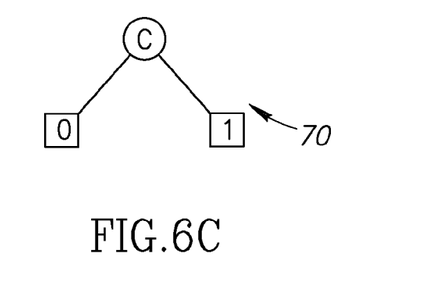
FIG. 6C is a BDD illustrating the function $F(A,B,C)=(A \& B)|C$, restricted to the case where B equals 0.

FIG. 6C shows the BDD, generally referenced 70, of $F|_{B=0}$, which is the resulting function of $F(A,B,C)=(A \& B)|C$ when B equals 0. The resulting function is $F(C)=C$.

Figure 6D:
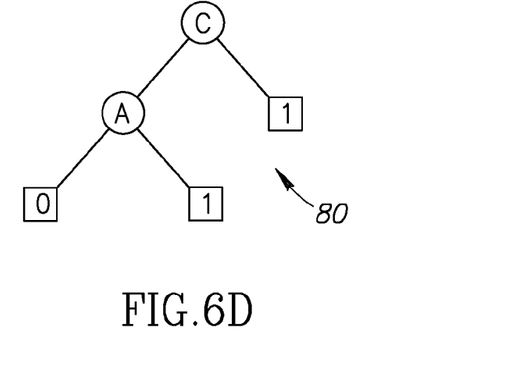
FIG. 6D is a BDD illustrating the function $F(A,B,C)=(A \& B)|C$, restricted to the case where B equals 1.

FIG. 6D shows the BDD, generally referenced 80, of $F|_{B=1}$, which is the resulting function of $F(A,B,C)=(A \& B)|C$ when B equals 1. The resulting function is $F(A,C)=A|C$.

Figure 6E:
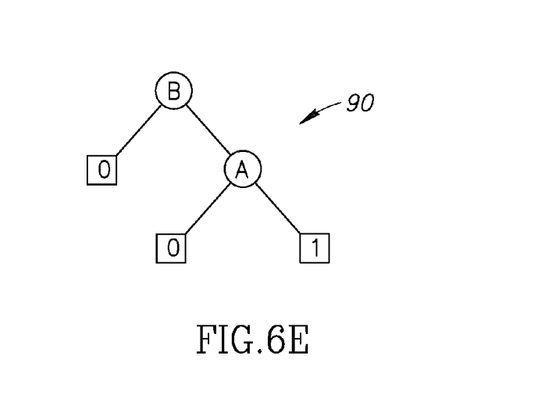
FIG. 6E is a BDD illustrating the function $F(A,B,C)=(A \& B)|C$, restricted to the case where C equals 0.

FIG. 6E shows the BDD, generally referenced 90, of $F|_{C=0}$, which is the resulting function of $F(A,B,C)=(A \& B)|C$ when C equals 0. The resulting function is $F(A,B)=A \& B$.

Figure 6F:
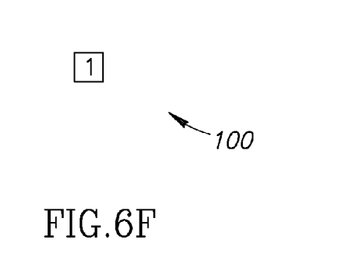
FIG. 6F is a BDD illustrating the function $F(A,B,C)=(A \& B)|C$, restricted to the case where C equals 1.

FIG. 6F shows the BDD, generally referenced 100, of $F|_{C=1}$, which is the resulting function of $F(A,B,C)=(A \& B)|C$ when C equals 1. The resulting function is F=1.

Once all the BDDs are constructed for all the variables, additional BDDs are constructed to demonstrate the influence of each variable. The influence of a variable is calculated as the resulting function of the instance where the original function calculated when the selected variable is one does not equal the original function when the selected variable is zero. In this example, $F|_{A=0}$ is C, and $F|_{A=1}$ is B|C. The resulting function that is derived from when $(F|_{A=0}) \neq (F|_{A=1})$ is $F\_A = B \& !C$. FIG. 7A shows the BDD, generally referenced 110, for the function $F_A = B \& !C$. FIG. 7B shows the BDD, generally referenced 120, for the function $F_B = A \& !C$, which is the resulting function from when $(F|_{B=0}) \neq (F|_{B=1})$. FIG. 7C shows the BDD, generally referenced 130, for the function $F_C = !A|!B$, which is the resulting function from when $(F|_{C=0}) \neq (F|_{C=1})$.

After BDDs are constructed for $F_A$, $F_B$ and $F_C$, the influence of each variable can be calculated by applying the BDD function count_bdd( ). FIG. 8A contains the BDD, generally referenced 140, of $F_A = B \& !C$. Traversing the BDD, it is determined that the function represented by the BDD equals one 25% of the time. Therefore the influence of A, L_A is 25%.

Similarly, FIG. 8B contains the BDD, generally referenced 150, of $F_B = A \& !C$. Traversing the BDD shows that $F_B$ also equals one 25% of the time. Therefore the influence of B, $L_B$ is 25%.

Finally, FIG. 8C contains the BDD, generally referenced 160, of $F_C = !A|!B$. Traversing the BDD shows that $F_C$ equals one 75% of the time. Therefore the influence of C, $L_C = 75\%$. Since $L_A$ equals 25% and $L_B$ equals 25%, they are the best candidates for elimination from the original clock gating function F $(A,B,C)=(A \& B)|C$. If variable A is (arbitrarily) chosen then the resulting approximation function $A_F = B|C$.

Another method which can find the variable with the least influence is called the direct method. The direct method is a brute force approach which first creates each of the approximations $F|_{Xj=0}|F|_{Xj=1}$ for each $X_j$. After all approximations are created, the suitability of each one is measured. Note that analyzing approximation functions via the brute force method will yield the same result as the method discussed supra, since all possible approximation functions are derived.

The method described above to eliminate a single variable from a clock gating function assumes that every variable (i.e. input signal) has equal probability of having the value zero and the value one. In instances where the probabilities are not equal, the influence functions can then be weighted accordingly. Instead of counting the lines of the truth table that have the value one for the influence function, each line is weighted by its probability. Instead of using the function count_bdd( ) in the symbolic method, a weighted count function is used which multiplies the total of the left tree of the BDD by the probability of the variable being zero, and the right tree of the BDD by the probability of the variable being to one.

In the previously discussed example represented by FIGS. 7A, 7B and 7C, suppose that the probability of signal B being one is 80% and the probability of it being zero is 20%. Also suppose that probabilities for variables A and C being one and zero are equal (i.e. 50/50). Therefore, $L_A$ equals 40%, $L_B$ equals 25%, and $L_C$ equals 60%. In this case, variable B is the leading candidate for elimination, which results in the following approximation $$A_F' = F|_{B=0}|F|_{B=1} = A|C$$

rather than the previous (i.e. when probabilities were equal)

$$A_F = F|_{A=0}|F|_{A=1} = B|C$$

There are instances when the arrival times of the signals (i.e. variables) into the clock gating function differ. If the arrival times of signals need to be taken into consideration, they can be weighted such that a signal with a late arrival time receives a low weight and a signal with an early arrival time receives a high weight. In this instance, the appropriately weighted variables are used in the previously defined method to eliminate a single variable from a clock gating function.

There are instances when the signal inputs (i.e. variables) into the clock gating function are either global or local signals. In this instance global signals are used to gate all latches in the design. To ensure that a global signal is not eliminated, a high weight is assigned to the signal. Conversely, lower weights are assigned to local signals. These weighted signals can then be multiplied by their respective influences, as discussed supra.

There are instances when the signal inputs (i.e. variables) into the clock gating function have different frequencies. Higher frequency signals are toggled by a faster clock than lower frequency signals. In this instance the input signals can be appropriately weighted according to their respective frequencies. These weighted signals can then be multiplied by their respective influences, as discussed supra.

The intersection coefficient technique of U.S. application Ser. No. 11/755,015, cited supra, for example, is operative to provide a weighting mechanism for input signals to the clock gating logic function. There are instances when there exist different intersection coefficients between the clock enable logic and the data logic. In this instance, signals in the intersection are given lower weights than the other input signals. These weighted signals can then be multiplied by their respective influences, as discussed supra.

Over-Approximation of Functions Expressed in a Normal Form

In operation, the invention analyzes of all the inputs and resulting output of a clock gated circuit. The method assumes (1) that each variable has an equal probability of having the value zero and the value one, (2) that every signal input (i.e. variable) into the clock gating function has the same arrival time and that (3) there are no other considerations to be taken into account. Later we remove these restrictions and consider the more general case. The method eliminates a single component from the original clock gating function expressed in a normal form. Components are clauses in functions expressed in CNF and literals in functions expressed in DNF.

In the instance where the clock gating function is expressed in CNF, removing one or more clauses results in a function such that the original function F implies the approximated function $A_F$. For example, by removing the clause (A|C) from the CNF form of function F(A,B,C)=(A & B)|C (the CNF representation being (A|C) & (B|C)), the resulting approximation is (B|C). If clause (B|C) is removed, then the resulting approximation is (A|C).

In the instance where the clock gating function is expressed in DNF, removing one or more literals from one or more clauses, results in an approximation such that the original function F implies the approximated function $A_F$. For example, by removing the literal A from the DNF representation of F(A,B,C)=(A & B)|C (note that this function is already expressed here in DNF), then the resulting approximation is (B|C). If the literal B is removed, then the resulting approximation is (A|C).

Figure 9:
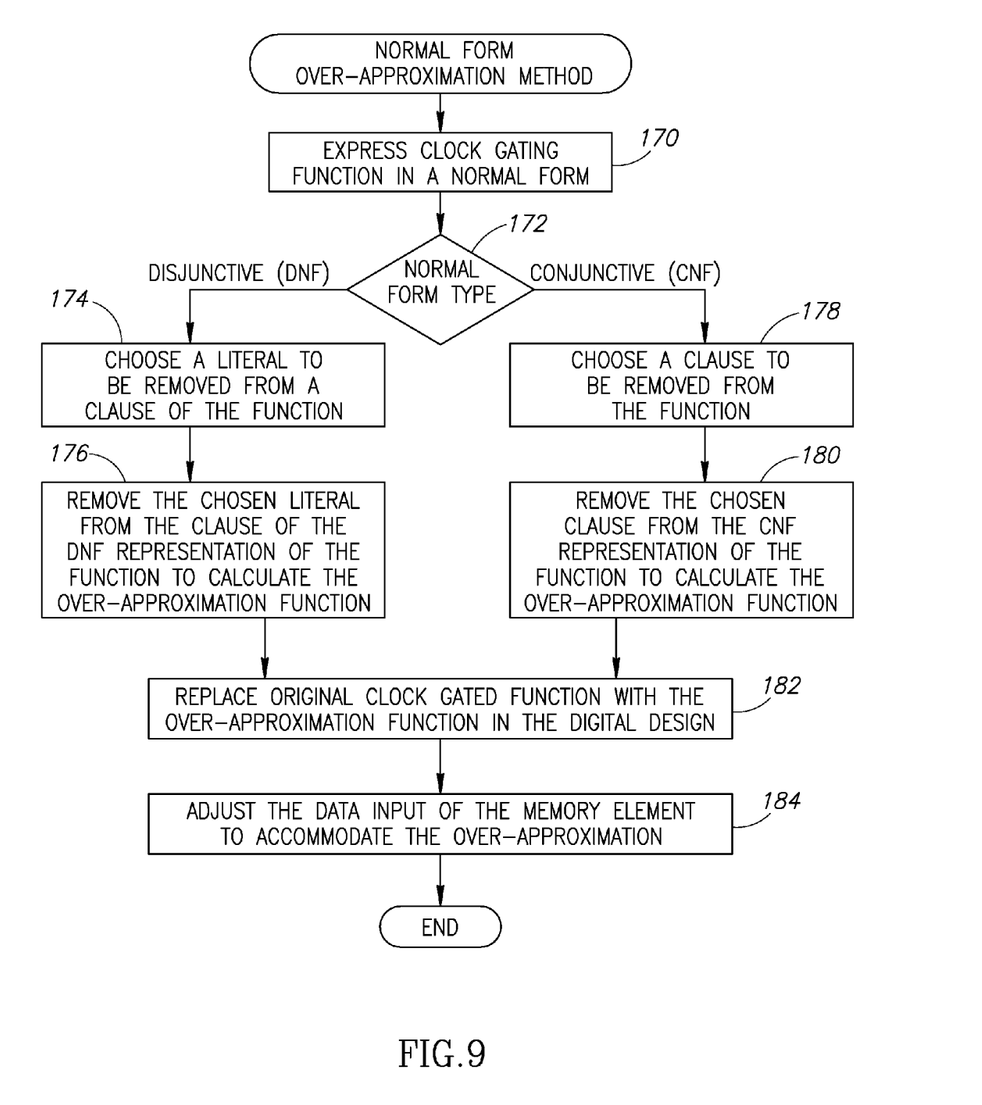
FIG. 9 is a flow diagram illustrating the normal form over-approximation method of the present invention.

A flow diagram illustrating the normal form approximation method of the present invention is shown in FIG. 9. In the first step, the clock gating logic function is expressed in a normal form (step 170). If the clock gating function is expressed in CNF, then a clause is chosen to be removed the function (step 178). The chosen clause is then removed from the CNF representation to calculate the approximation function (step 180). Finally, the original clock gating function is replaced with the approximation function in the digital design (step 182). Alternatively, if the clock gating function is expressed in DNF, then a literal is chosen to be removed from a clause of the function (step 174). The chosen literal is then removed from the DNF representation to calculate the approximation function (step 176). The original clock gating function is then replaced with the over-approximation function in the digital design (step 182). Finally, using the steps previously described in connection with FIG. 2, the data input to the memory element is adjusted in order to accommodate the over-approximation (step 184).

Choosing the component (i.e. a clause for CNF or a literal for DNF) can be arbitrary, or can be based on (but not limited to) various considerations. For example, components can be selected based on (1) the number of variables they contain; (2) the probability of their assertion; (3) the arrival time of their signals (i.e. variables); (4) the scope of their signals (i.e. variables); (5) the frequency of their signals (i.e. variables); or (6) the participation of their signals (i.e. variables) in the intersection between the clock enable and the data logic.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of over-approximating an input clock gating function associated with a memory element having a plurality of variables; said method comprising the steps of:

selecting one of said plurality of variables to be eliminated from said function;

removing said selected variable from said function;

calculating, by using a computer, an approximation function to reflect the absence of said selected variable;

replacing the original clock gating function with said approximation function; and adjusting the data input of the memory element to accommodate the over-approximation in accordance with a comparison between said input clock gating function and said approximation function.

2. The method according to claim 1, wherein said step of selecting a variable to be eliminated comprises the steps of:

calculating an influence of each variable in said clock gating function; and selecting the variable that exhibits the least influence.

3. The method according to claim 2, wherein said step of calculating the influence of each variable comprises the steps of:

creating a binary decision diagram (BDD) of a function representing said clock gating function wherein said variable is set to zero, to yield a first result thereby;

creating a BDD of a function representing said clock gating function wherein said variable is set to one, to yield a second result thereby;

calculating a new function representing the instance of a function of said first result not being equal to a function of said second result;

creating a BDD in accordance with said new function; and calculating a probability that a result of said new function equals one.

4. The method according to claim 3, wherein said step of calculating a probability comprises the step of adjusting the calculation when the probability of each variable equal to one is known.

5. The method according to claim 1, wherein at least one of said variables comprises an input signal weighted in accordance with its arrival time.

6. The method according to claim 1, wherein at least one of said variables comprises an input signal weighted in accordance with its scope.

7. The method according to claim 1, wherein at least one of said variables comprises an input signal weighted in accordance with its frequency.

8. The method according to claim 1 wherein at least one of said variables comprises an input signal weighted in accordance with its intersection coefficient.

9. The method according to claim 1 wherein at least one of said variables comprise an input signal with greater significance.

10. The method according to claim 8, wherein said intersection coefficient is calculated as the number of inputs shared between data logic and clock enable logic of the clock gating function.

11. A method of over-approximating an input clock gating function associated with a memory element, said input clock gating function represented in conjunctive normal form (CNF) having a plurality of clauses; said method comprising the steps of:
    selecting one of said plurality of clauses to be eliminated from said CNF representation;
    removing said selected clause from said CNF representation;
    calculating, by using a computer, an approximation function reflecting the absence of said selected clause;
    replacing said original clock gating function with said approximation function; and
    adjusting the data input of the memory element to accommodate the over-approximation in accordance with a comparison between said input clock gating function and said approximation function.

12. A method of over-approximating an input clock gating function associated with a memory element, said input clock gating function represented in disjunctive normal form (DNF) having a plurality of literals; said method comprising the steps of:
    selecting one of said plurality of literals to be eliminated from said DNF representation;
    removing said selected literal from said DNF representation;
    calculating, by using a computer, an approximation function reflecting the absence of said selected literal;
    replacing said original clock gating function with said approximation function; and
    adjusting the data input of the memory element to accommodate the over-approximation in accordance with a comparison between said input clock gating function and said approximation function.

13. A method of over-approximating an input clock gating function associated with a memory element, said input clock gating function expressed in normal form containing a plurality of components; said method comprising the steps of:
    selecting one of said plurality of components to be eliminated from said normal form representation;
    removing said selected component from said normal form representation;
    calculating, by using a computer, an approximation function reflecting the absence of said selected component;
    replacing said original clock gating function with said approximation function; and
    adjusting the data input of the memory element to accommodate the over-approximation in accordance with a comparison between said input clock gating function and said approximation function.

14. The method according to claim 13, wherein said components are weighted in accordance to the number of variables contained in said component.

15. The method according to claim 13, wherein at least one of said components is weighted in accordance to the probability of its assertion.

16. The method according to claim 13, wherein at least one of said components comprises an input signal weighted in accordance with its arrival time.

17. The method according to claim 13, wherein at least one of said components comprises an input signal weighted in accordance with its scope.

18. The method according to claim 13, wherein at least one of said components comprises an input signal weighted in accordance with its frequency.

19. The method according to claim 13, wherein at least one of said components comprises an input signal weighted in accordance with its intersection coefficient.

20. The method according to claim 19, wherein said intersection coefficient is calculated as the number of inputs shared between data logic and clock enable logic of the clock gating function.

* * * * *